United States Patent
Lerch et al.

(10) Patent No.: US 7,388,493 B2
(45) Date of Patent: Jun. 17, 2008

(54) METHOD AND SYSTEM FOR PREVENTING UNAUTHORIZED REMOVAL AND USE OF AN RFID APPARATUS

(75) Inventors: John W. Lerch, Indialantic, FL (US); Joshua M. Girvin, Indialantic, FL (US)

(73) Assignee: Bartronics America, Inc., Santa Clara, CA (US)

( * ) Notice: Subject to any disclaimer, the term of this patent is extended or adjusted under 35 U.S.C. 154(b) by 0 days.

(21) Appl. No.: 11/245,482

(22) Filed: Oct. 6, 2005

(65) Prior Publication Data

US 2006/0087438 A1    Apr. 27, 2006

Related U.S. Application Data

(60) Provisional application No. 60/617,518, filed on Oct. 8, 2004.

(51) Int. Cl.
*G08B 13/14* (2006.01)
(52) U.S. Cl. .............. 340/572.1; 340/572.3; 340/572.8; 340/573.1
(58) Field of Classification Search .......... 340/572.1
See application file for complete search history.

(56) References Cited

U.S. PATENT DOCUMENTS

| 4,833,807 | A |   | 5/1989  | McLean |
|-----------|---|---|---------|--------|
| 4,980,671 | A |   | 12/1990 | McCurdy |
| 5,448,846 | A |   | 9/1995  | Peterson et al. |
| 5,457,906 | A |   | 10/1995 | Mosher, Jr. |
| 5,471,197 | A |   | 11/1995 | McCurdy et al. |
| 5,504,474 | A |   | 4/1996  | Libman et al. |
| 5,883,576 | A | * | 3/1999  | De La Huerga ......... 340/573.1 |
| 5,973,598 | A |   | 10/1999 | Beigel |
| 5,973,600 | A |   | 10/1999 | Mosher, Jr. |
| 5,979,941 | A | * | 11/1999 | Mosher et al. ............... 283/67 |
| 6,043,746 | A |   | 3/2000  | Sorrells |
| 6,050,622 | A |   | 4/2000  | Gustafson |
| 6,211,790 | B1|   | 4/2001  | Radomsky et al. |
| 6,236,319 | B1|   | 5/2001  | Pitzer et al. |
| 6,255,951 | B1|   | 7/2001  | De La Huega |
| 6,346,886 | B1|   | 2/2002  | De La Huega |
| 6,421,013 | B1|   | 7/2002  | Chung |
| 6,431,455 | B1|   | 8/2002  | Ponert |
| 6,693,543 | B1|   | 2/2004  | Stephenson et al. |
| 6,782,648 | B1|   | 8/2004  | Mosher, Jr. |

(Continued)

*Primary Examiner*—George Bugg
(74) *Attorney, Agent, or Firm*—Hamilton, Brook, Smith & Reynolds, P.C.

(57) ABSTRACT

A method for authorizing use of a disabling RFID apparatus includes attaching the apparatus to a wearer, verifying credentials associated with use of the apparatus, and tightening the apparatus to the wearer to prevent unauthorized removal of the apparatus. Optionally, an additional security method can include updating a data field indicating the credentials have been verified and the apparatus has been tightened to the wearer. In one embodiment, the RFID apparatus can include a band having a series of holes along a length thereof and an electrically conductive loop disposed in the band, wherein severance of the electrically conductive loop disables the apparatus. In another embodiment, the RFID apparatus can further include a tightening mechanism for attaching the apparatus to the wearer. The tightening mechanism can include a series of projections positioned to allow the apparatus to be tightened and not loosened. The series of projections can sever the electrically conductive loop on an attempt to loosen the band.

19 Claims, 5 Drawing Sheets

U.S. PATENT DOCUMENTS

| | | |
|---|---|---|
| 6,888,509 B2 | 5/2005 | Atherton |
| 2002/0067264 A1 | 6/2002 | Soehnlen |
| 2002/0084904 A1 | 7/2002 | De La Huega |
| 2003/0075608 A1 | 4/2003 | Atherton |
| 2003/0173408 A1* | 9/2003 | Mosher et al. .............. 235/492 |
| 2004/0066296 A1 | 4/2004 | Atherton |

* cited by examiner

METHOD AND SYSTEM FOR PREVENTING UNAUTHORIZED REMOVAL AND USE OF AN RFID APPARATUS

RELATED APPLICATION

This application claims the benefit of U.S. Provisional Application No. 60/617,518, filed on Oct. 8, 2004, the entire teachings of which are herein incorporated by reference.

BACKGROUND OF THE INVENTION

Radio-frequency identification (RFID) technologies have been incorporated into bracelets and are being used for such things as identification, access control, and age verification. For example, various venues have begun to use RFID bracelets to quickly and uniquely identify patrons that have access to restricted areas, such as back stage events, alcoholic beverage sales, etc.

These bracelets can be made using a narrow band of plastic or other suitable material and a prefabricated RFID tag, so that they are inexpensive to produce and easy to use. However, such RFID bracelets are susceptible to misuse and unauthorized use. In instances where an RFID bracelet is improperly (loosely) attached to an authorized wearer's wrist, the bracelet can be slid over the wearer's wrist and removed from the wearer without disabling the RFID function of the bracelet. Once the bracelet is removed, the authorized patron could provide the opportunity to give access to a restricted area to an unauthorized patron. For example, a patron with an "adult" RFID bracelet that allows access to alcoholic beverage sales could be removed and given or sold to a patron not of legal drinking age.

A number of mechanical measures have been taken to prevent such RFID bracelets from being transferred. Most prominent is the use of a single-use locking mechanism found on some plastic bracelets. Also known are adhesive locking mechanisms with slits that prevent the wearer from peeling the adhesive back and reattaching it. These mechanisms render tampering with the locking device obvious to a visual inspection of the RFID bracelet and, in most cases, render the bracelet unwearable after removal. However, these mechanical measures can still be loosely attached to an authorized patron thereby allowing the patron to remove the bracelet.

SUMMARY OF THE INVENTION

In some instances personnel administering an authorized RFID bracelet haphazardly attach the RFID bracelet to an authorized wearer such that removal is possible by sliding the bracelet over the wrist. As such, the RFID bracelet can be removed and given or sold to an unauthorized user. The unauthorized user can then slide the RFID bracelet over his or her wrist and proceed to make unauthorized purchases and/or enter restricted areas. Ultimately the issuing venue is responsible for these unauthorized uses. For example, if a minor uses an authorized person's RFID bracelet to purchase alcoholic beverages, the issuing venue can loose its license to sell such beverages and/or be imposed a fine.

The present invention is an authorization method and system for an RFID bracelet that can be tightened after it is attached to an authorized wearer such that unauthorized removal of the bracelet disables the RFID functionality.

In particular, a method for authorizing use of a disabling RFID apparatus includes attaching the apparatus to a wearer, verifying credentials associated with use of the apparatus, and tightening the apparatus to the wearer to prevent unauthorized removal of the apparatus. An optional security method can be included by updating a data field indicating the credentials have been verified and the apparatus has been tightened to the wearer. The method further includes checking the validity of the RFID apparatus prior to use and using the RFID apparatus upon validation, wherein checking the validity of the RFID apparatus includes visually inspecting the RFID apparatus by an authorized person or electronically inspecting the RFID apparatus using an RFID reading system.

In a preferred embodiment, electronically inspecting the RFID apparatus using an RFID reading system includes placing the RFID apparatus in proximity to an RFID reader, and, if the RFID apparatus is functional, reading identification information associated with the RFID apparatus. Next, a database is searched using the identification information of the RFID apparatus to determine if the data field has been updated indicating the credentials have been verified and the apparatus has been tightened to the wearer. Use of the RFID apparatus is allowed if the data field has been updated.

In one embodiment, the RFID apparatus can include an electrically conductive loop disposed in the band, wherein severance of the electrically conductive loop disables the apparatus.

In another embodiment, the RFID apparatus can further include a tightening mechanism for attaching the apparatus to the wearer. The tightening mechanism can include a series of projections positioned to allow the apparatus to be tightened and not loosened. The series of projections can sever the electrically conductive loop on an attempt to loosen the band.

In yet another embodiment, the RFID apparatus can include an RFID circuit disposed in the band and an antenna also disposed in the band. The RFID circuit, the antenna, and the electrically conductive loop are coupled in series, wherein severance of the electrically conductive loop necessarily disables the RFID circuit.

The credentials associated with use of the apparatus can include age of the wearer, access to a restricted area, and/or a reentry request. In one embodiment, the credentials associated with use of the apparatus can be verified by authorized personnel.

In still a further embodiment, the credentials data field can be stored on an electrically erasable programmable read-only memory within an RFID chip or in an external database.

While the present invention is described in the form of an RFID bracelet, it will be appreciated by those skilled in the art that the teachings herein are applicable in many other form factors and uses, such as for use as an ankle-band.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Generally, passive radio frequency identification (RFID) bracelets include circuits containing an antenna and other circuitry that responds to an RF interrogation signal. In response to the RF interrogation signal, a transponder emits an RF signal representative of information pre-stored or pre-programmed into the transponder. For example, the information could include a serial number, the date the bracelet is issued, the date the bracelet expires and will no longer be usable for access, the age status of the wearer, and/or whether the bracelet can be used for purchasing goods or services. Any other desired information, depending on the context in which the bracelet is to be used, may be pre-stored or pre-programmed in the transponder. Information stored on the transponder chip may also be used to access information stored in a database.

The antenna is typically formed as an etched copper coil, though it may be formed using a conductive ink, electrode-posited copper, or the like. The transponder is electrically connected to and derives power from the RF signal received by the antenna.

In addition, a connection is made between the antenna and the transponder in the form of a continuous electrically conductive loop that extends along the length of the wristband. The conductive loop serves a disabling function such that severance of any portion of the wristband also severs the conductive loop, thus rendering the RFID function of the bracelet inoperable. Consideration should be given to the distance between the sections of the loop antenna that form the conductive loop in order to minimize inductance that can lead to possible interference with operation of the transponder and/or antenna. More details of this design concept can be found in co-pending U.S. patent application Ser. No. 10/400,049 on Mar. 26, 2003 by Girvin, J., and Lerch, J., entitled "Non-Reusable Identification Device", assigned to Proximities, Inc., the assignee of the present application, and incorporated by reference herein in its entirety.

Figure 1A:
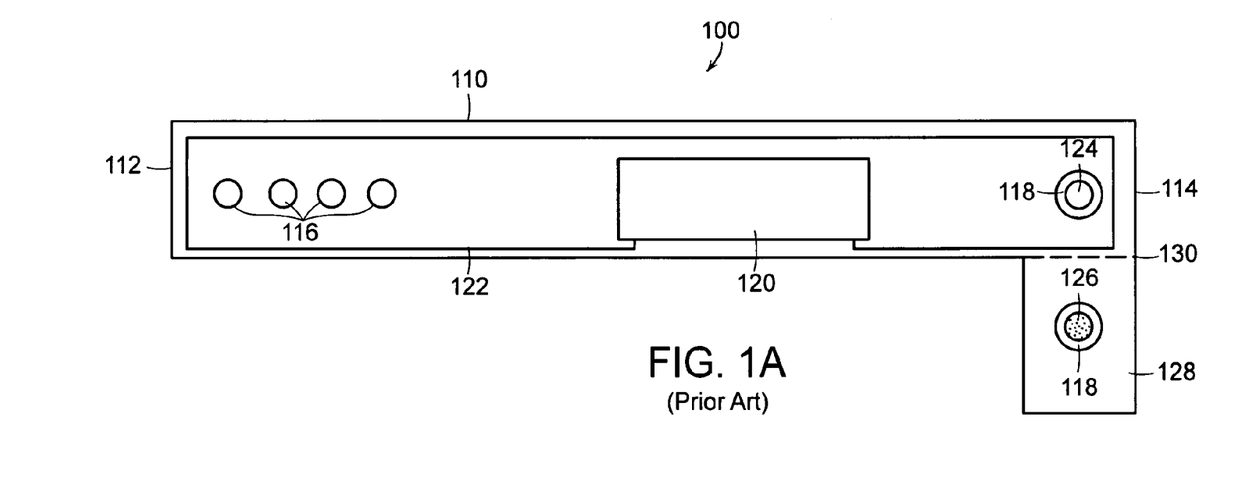
FIG. 1A shows a plan view of an RFID bracelet using a single use locking-hole mechanism according to the prior art.

FIG. 1A is a general illustration of a Radio Frequency Identification (RFID) bracelet 100 using a single use locking-hole mechanism according to the prior art. The bracelet 100 is generally an elongated band 110 with opposite ends 112, 114 that can be brought together and fastened to form a closed loop around a wearer's wrist, for example. The band 110 includes a plurality of adjustment holes 116, a single-use locking mechanism 118, and an RFID transponder circuit 120 including a tamper wire 122 that is an electrically conductive continuous loop running along the length of the band 110. The combination of the RFID transponder circuit 120 and tamper wire 122 preferably span the length of the band 110, such that any cut, tear, or severing made to remove the band 110 from the wearer will necessarily render the bracelet 100 unusable.

The single-use locking mechanism 118 is a mechanical non-reusable tamper-resistant locking mechanism. As illustrated, the single-use locking mechanism 118 consists of a barbed peg 124 and a locking hole 126 in a flap 128 of the band 110. The single-use locking mechanism 118 is used to fasten the opposite ends 112, 114 of the band 110 together under the flap 128 to form the closed loop as will be explained in more detail below.

The adjustment holes 116 are used to adjust the bracelet 100 to conform to body parts of different circumferences, e.g., a wrist or an ankle. When the opposite ends 112, 114 of the band 110 are brought together, the barbed peg 124 is inserted through a selected hole 116 as required for a snug fit. The flap 128 is then folded along an imaginary line 130 and the barbed peg 124 is then passed through the locking hole 126. The barbed peg 124 is shaped to resist removal from the locking hole 126 without also destroying the locking mechanism 118 and rendering it incapable of being refastened. In some instances personnel administering the bracelet 100 haphazardly attach the bracelet 100 to the wearer such that removal is possible by sliding the bracelet 100 over the wrist.

Figure 1B:
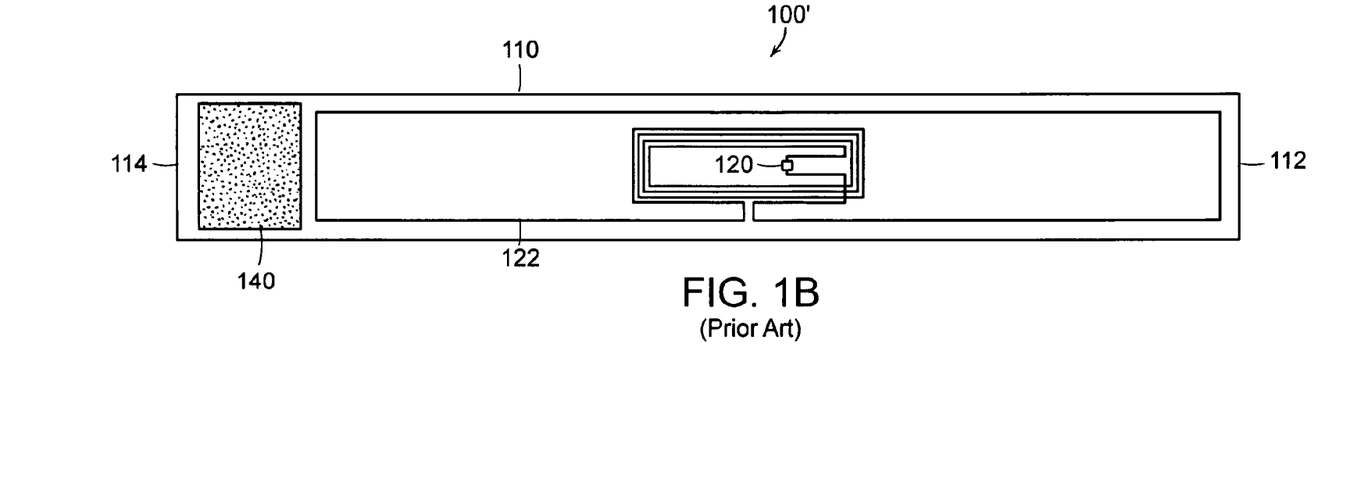
FIG. 1B shows a plan view of an RFID bracelet using an adhesive locking mechanism according to the prior art.

FIG. 1B is a general illustration of an RFID bracelet 100' using an adhesive locking mechanism 140 according to the prior art. The bracelet 100' includes similar components as described with reference to FIG. 1A, except the adjustment holes 116 and the locking mechanism 118 have been replaced with an adhesive locking mechanism 140. The adhesive locking mechanism 140 is used to adjust the bracelet 100' to conform to body parts of different circumferences and is well known in the art. Personnel administering the bracelet 100', as with the bracelet of FIG. 1A, haphazardly attach the bracelet 100' to the wearer such that removal is possible by sliding the bracelet 100' over the wrist.

It is preferable that one of the tamper wire 122 or the RFID transponder circuit 120 overlap with the adhesive mechanism 140. This results in a disabling of the bracelet 100' when the adhesive locking mechanism 140 is pulled apart from the band surface to which it is adhered during bracelet 100' attachment. While the RFID transponder 120 is depicted in the center of the band 110' in the previously described embodiments, it can also be located near or at an opposite end 112', 114' of the band 110'.

Figure 2A:
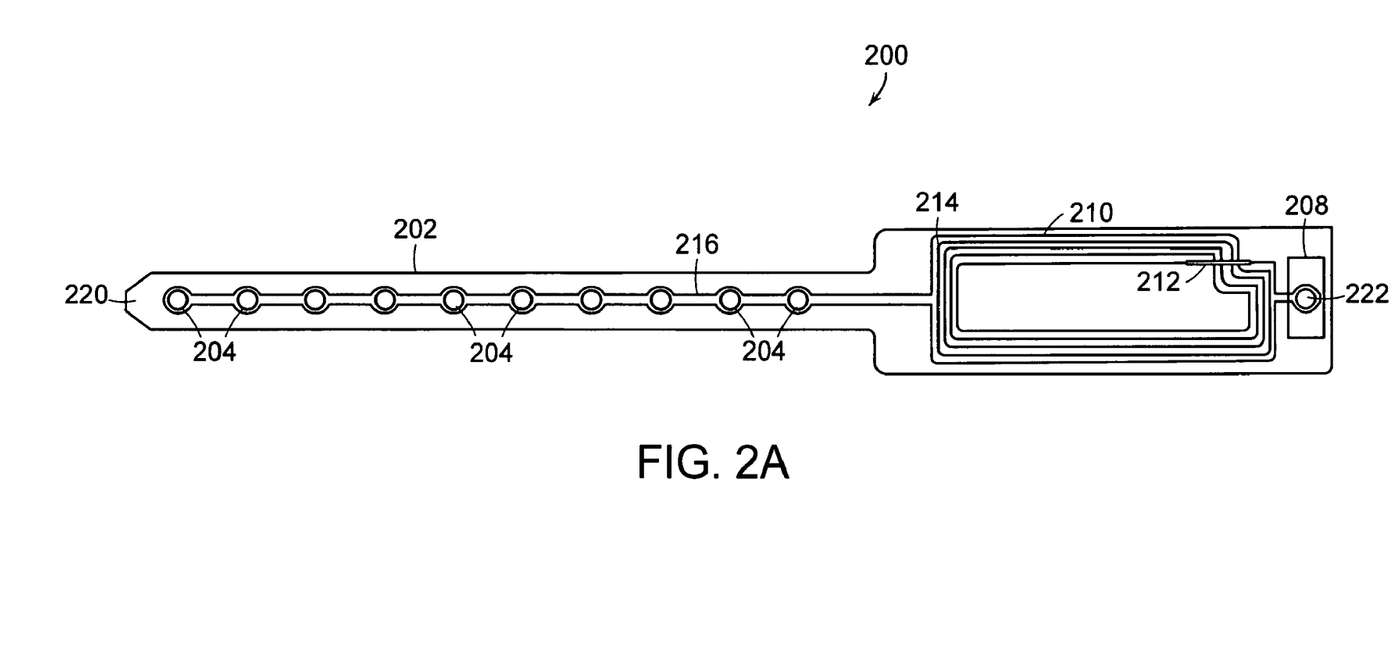
FIG. 2A shows a plan view of an embodiment of the RFID bracelet including one embodiment of a tightening mechanism.

FIG. 2A illustrates one embodiment of an RFID apparatus 200 according to the present invention that is adapted for mechanisms that tighten the wristband around a wearer's wrist or ankle. The apparatus includes a band portion 202 including a plurality of adjustment holes 204, a tightening locking mechanism 208, and an RFID circuit 210. The RFID circuit 210 includes a radio frequency identification (RFID) transponder chip 212, and an antenna element 214. The antenna element 214 is coupled to an electrically conductive loop 216 that preferably runs down the length of the band portion 202 and preferably closely surrounding each of the adjustment holes 204. The RFID apparatus 200 includes a hole 222 into which a tightening mechanism 208 may fit.

Figure 2B:
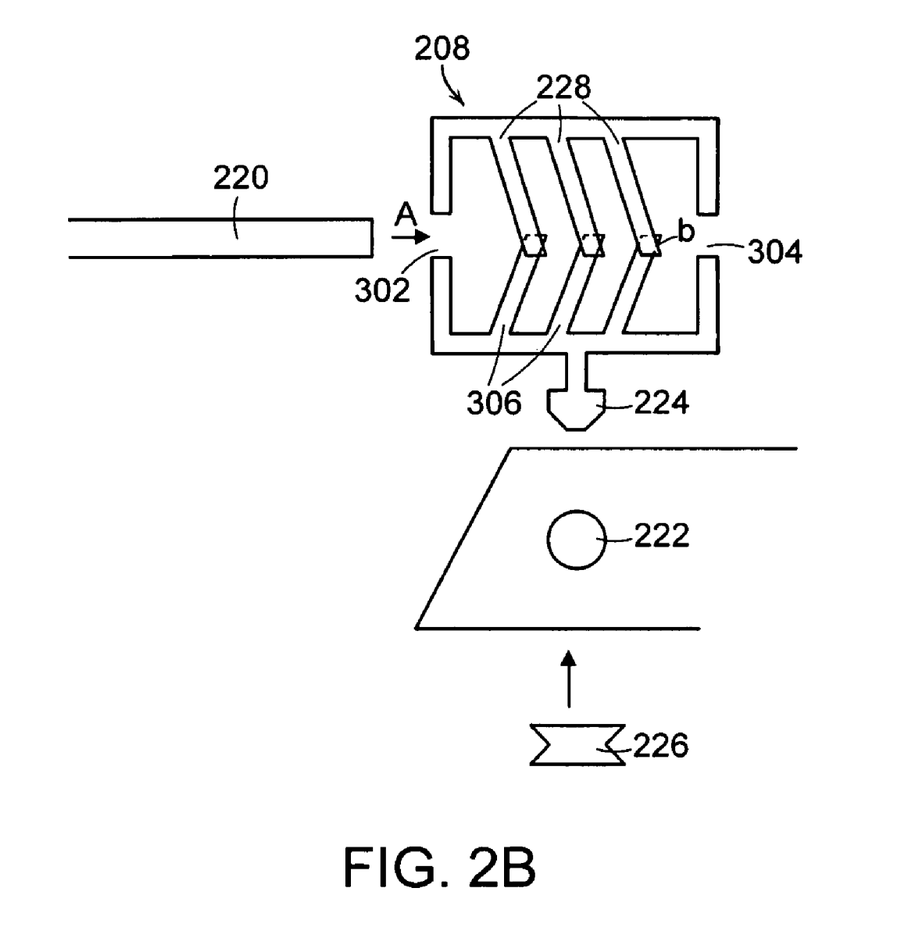
FIG. 2B shows a partial, exploded cross-sectional view of the tightening mechanism of FIG. 2A.

As shown in FIG. 2B, an exemplary tightening mechanism includes a housing 300 having an entrance opening 302 at a first end and an exit opening 304 at an opposite end thereof. Openings 302, 304 are dimensioned to allow a tail 220 of band 202 to pass therethrough.

A first series of projections 228 are disposed within housing 300 and extend towards a path defined by openings 302, 304. A second series of projections 306 extends generally towards projections 228. Projections 228 and 306 are in substantially facing relationship across a gap b. Gap b being sized, and projections 228, 306 being disposed to engage holes 204 as tail 220 moves in the direction of arrow A through housing 300. In a preferred, but not limiting example, projections 228, 306 are angled in the downstream direction of arrow A. Housing 300 may be a fit onto band portion 202 through an extension 224 formed on a bottom portion of the tightening mechanism housing 300 extending through hole 222 and secured by a snap 226.

In order to fasten the RFID apparatus 200 band to the wrist or ankle of a wearer, the tail 220 of band 202 is inserted into the tightening mechanism 208, such that the tail 220 fits into an interior portion of the tightening mechanism 208. Projections 228, 306 are angled inward to engage portions of the tail 220 as it is inserted therein in the direction of arrow A and tightened against the wearer's wrist or ankle. The tightening mechanism 208 arrangement thus permits or provides an RFID bracelet 200 that can be tightened against a wearer's wrist or ankle without necessarily severing the electrically conductive loop 216.

The projections 228, 306 inside the tightening mechanism 208 engage respective adjacent ones of the holes 204 as the tail 220 is drawn through the tightening mechanism 208. The projections 228, 306 may deflect in the direction of arrow A, but are rigid in the opposite direction. Any attempt by the wearer to remove the apparatus 200 by pushing and/or pulling the band portion 202 back through the tightening mechanism 208 in a direction opposite to arrow A with sufficient force will thus cause damage to its respective hole 204, thereby rupturing the adjacent portion of the electrically conductive loop 216. The RFID chip 212 becomes disabled once the electrically conductive loop 216 becomes ruptured or severed.

It should be noted that an angled camming type of projection is shown by way of example. However, any type of projection which deflects more easily in one (specific) direction than another may be used.

In other embodiments, the tightening mechanism 208 can be a ratchet and pawl type assembly wherein the holes 204 are replaced by a series of teeth along a length of the band 202. The teeth can engage the ratchet and pawl type assembly in a one way direction thereby allowing the apparatus to be tightened to a wearer, but do not allow movement in the reverse direction damaging the RFID circuit. However, it may be desirable to include a release mechanism for the ratchet and pawl type assembly such that the apparatus can be removed for reuse. For example, a financial deposit can be required when the bracelet is issued to a wearer to help recover bracelets for reuse. Once the wearer is finished using the bracelet, the wearer can return the bracelet to authorized personnel and receive the wearer's deposit back. However, the RFID function of the apparatus will become disabled once the release mechanism is engaged, such as by software, to allow removal of the apparatus. The RFID function can only be enabled by authorized personnel.

Figure 3A:
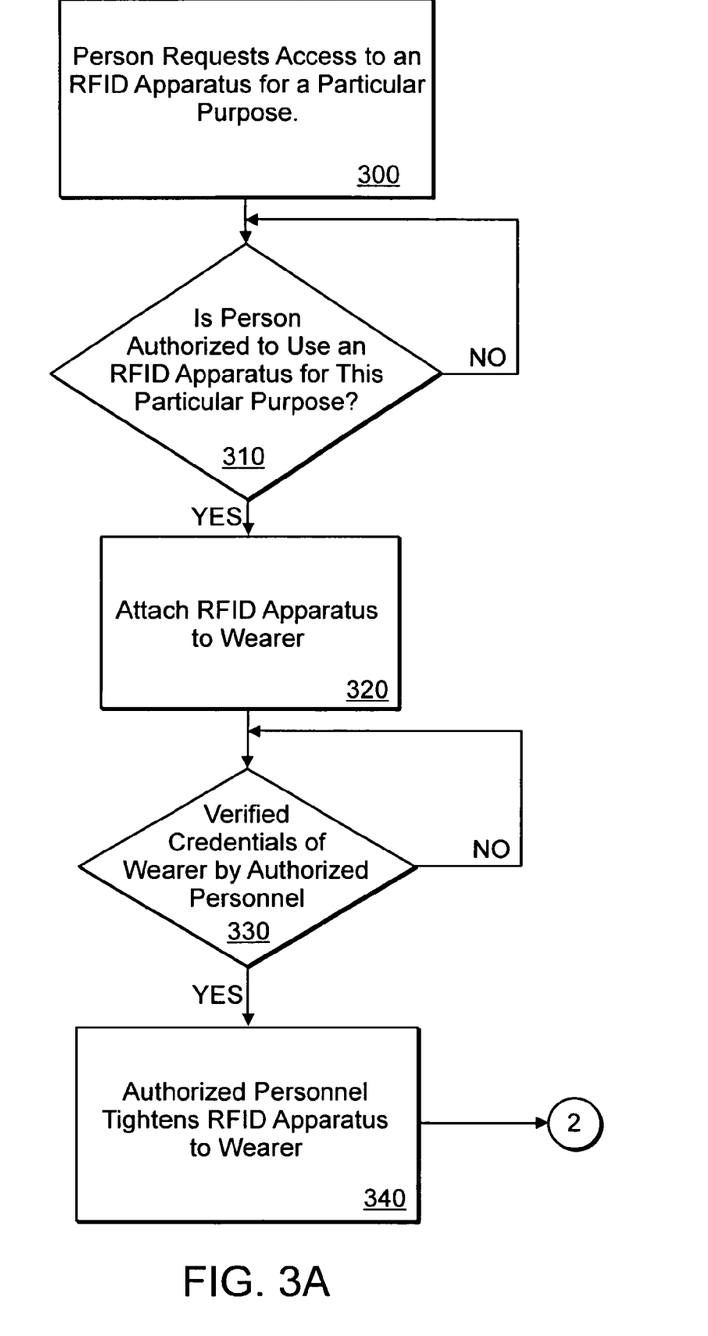
FIGS. 3A and 3B show a flow chart diagram for activating the RFID bracelet of FIGS. 2A and 2B.
Figure 3B:
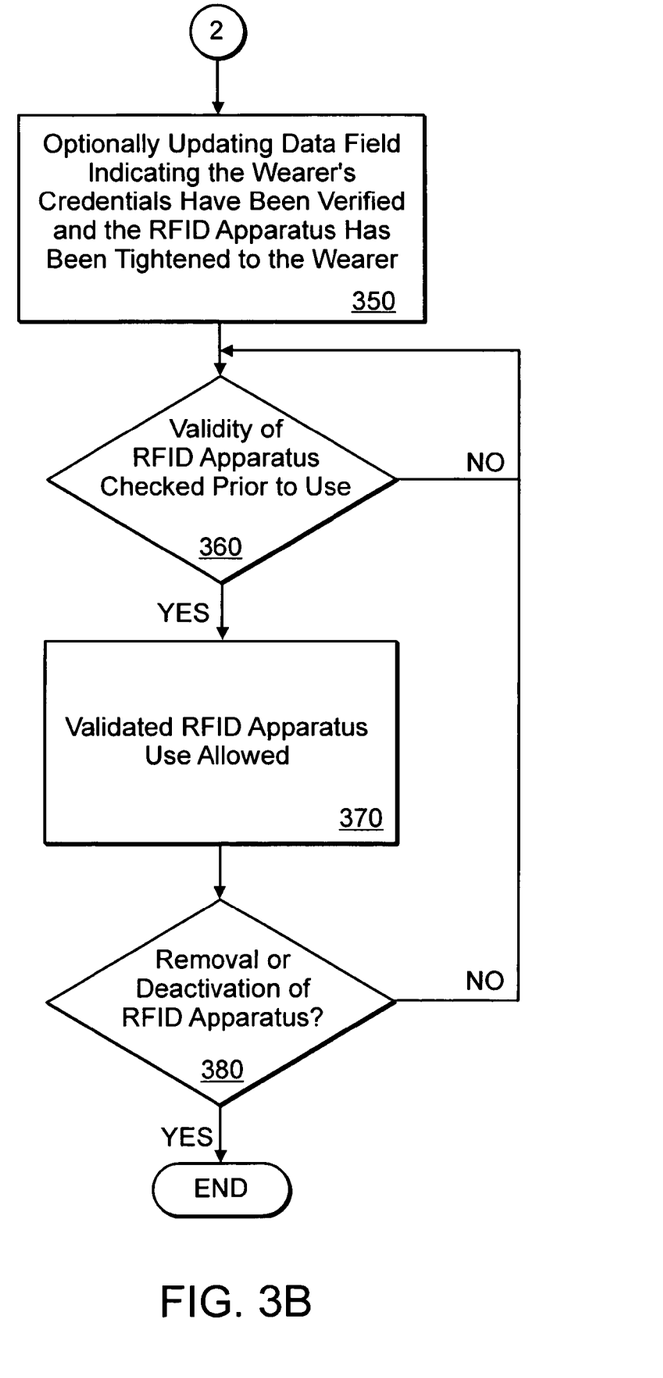

FIGS. 3A and 3B show a flow diagram of a method of using the adjustable RFID apparatus 200 shown in FIGS. 2A and 2B or even other potentially differently configured adjustable wristbands in order to prevent unauthorized use of unauthorized removed or discarded bracelets. In connection with a first step 300 of the process, a person requests access to an RFID apparatus 200 for a particular purpose, such as authorized purchases, entry to a restricted area, and/or exit and reentry to a venue. For example, the age of a person is verified in the connection of purchasing alcoholic beverages, whereas a guest list could be checked to determine if the person has access to a restriction area. In the event for a request for reentry, the system would know that the person had previously been checked by an authorized party and would grant reentry to the venue. In each instance, an RFID apparatus 200 is issued (granted) if access to a venue is authorized for such purposes (step 310). Access is denied if the apparatus is not authorized.

Next (step 320), the person (wearer) or an authorized person attaches the RFID bracelet to the requesting wearer's wrist or ankle. An authorized person, who may be different from the authorized person of step 320, verifies the credentials of the wearer of the bracelet 200 (step 330). For example, at a venue where some patrons may be entitled to access alcoholic beverages and others may not, alcoholic beverage dispensing personnel may verify the credentials of the particular person. After step 330 is performed, the authorized person tightens the bracelet 200 snugly against the wearer of the bracelet 200 (step 340). The authorized person should tighten the bracelet snugly enough so that the bracelet 200 cannot be slid off the wrist or ankle without incurring the aforementioned damage.

In particular, the bracelet 200 is tightened sufficiently against the wrist or ankle of the wearer so that any attempt to remove the bracelet 200 by backing the tail 220 of the band portion 202 out of tightening mechanism 208 in a direction opposite to arrow A will cause damage to the electrically conductive loop 216 adjacent to one or more of the holes 204. This process thus prevents a situation which might otherwise occur when an unauthorized person, such as someone under legal drinking age obtains access to an older person's alcohol-authorized bracelet 200, who only secured it loosely to their wrist and then subsequently slipped the wristband off of the wrist and handed it to an unauthorized person. At this point the individual wearing bracelet 200 is authorized for access to the appropriate limited services, such as the service of alcoholic beverages.

An optional security measure (step 350 in FIG. 3B) can include updating a data field that indicates the credentials of the wearer have been verified and that the bracelet 200 has been tightened by an authorized person. At this point, the individual wearing bracelet 200 is authorized for access to the appropriate limited services, such as the service of alcoholic beverages. However, the bracelet 200 is checked for validity (step 360) each time the wearer tries to engage in such limited services.

Alternatively, in lieu of using a wristband with tightening capabilities, other identification apparatus can be used, such as a wristband with a generic single-use adhesive or barbed-peg and hole closure mechanism. Rather than tightening the wristband, as previously described, the authorized person would instead visually inspect the apparatus to ensure that it is adequately attached to the wearer. If the apparatus is not adequately attached, such as if there is a cut in the band or if it is on too loosely attached, the authorized person would replace the apparatus before issuing the individual authorization. As in the previous embodiment, the optional security measure (step 350) can subsequently be entered.

The validity (step 360) of the bracelet 200 can be checked by either visually inspecting the bracelet 200 for tears by an authorized person or electronically inspecting the bracelet 200 utilizing an RFID reading system. Utilizing an RFID reading system, the bracelet 200 is placed in proximity to an RFID reader. If the bracelet 200 is functional (not tampered with), the reader reads identification information associated with the bracelet 200. Next, a database may be searched using the identification information of the bracelet to determine if the data field has been updated indicating the credentials have been verified and the apparatus has been tightened to the wearer. If the data field has been updated, the intended purpose (use) of the bracelet 200 is allowed.

At the end of an event or after using the bracelet 200 the wearer may wish to remove the bracelet 200 (step 380).

Upon removal the bracelet 200, the RFID functionality of the bracelet 200 ceases to operate. In some instances, a predetermined time limit or spending limit may be associated with the bracelet 200 which when reached will also deactivate the RFID functionality of the bracelet 200.

Other scenarios in addition may be printing or other markers attached to valid identification bands which can be checked by an authorized party prior to the securing the band tightly.

In connection with step 350, the data field updating step can be performed by accessing data that is stored on an Electrically Erasable Programmable Read-Only Memory (EEPROM) within the bracelet 200 specifically within the RFID chip 212 and/or accessing a database while the bracelet 200 is in the vicinity of a reader.

In a preferred embodiment, projections 228 of the tightening mechanism 208 are formed with a thick enough portion of material and/or physically stronger materials than the materials used to form the bracelet 200. This guarantees that the bracelet 200 will break prior to individual projections 228 breaking, thus further ensuring that the electrically conductive loop 216 is disrupted when the bracelet is attempted to be removed or modified.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for authorizing use of a disabling RFID apparatus, comprising:
   adjustably attaching the RFID apparatus to a wearer via a fastening device configured to allow adjustment only in a direction that tightens the RFID apparatus on the wearer;
   verifying credentials of the wearer associated with authorization for a particular use of the RFID apparatus; and
   only if the credentials are verified, updating a data field associated with the RFID apparatus that indicates the credentials have been verified and tightening the RFID apparatus to the wearer by adjusting the fastening device in the allowed direction to prevent unauthorized removal of the RFID apparatus.

2. The method of claim 1, further including:
   checking the validity of the RFID apparatus prior to use; and
   authorizing use of the RFID apparatus upon validation.

3. The method of claim 1, wherein said RFLD apparatus includes a tamper detecting mechanism for indicating that said RFID apparatus has been tampered with and further including checking whether the RFID apparatus has been tampered with.

4. The method of claim 3, wherein checking whether the RFID apparatus has been tampered with includes one of visually inspecting the tamper detecting mechanism by an authorized person and electronically inspecting the tamper detecting mechanism using an RFID reading system.

5. The method of claim 4, wherein electronically inspecting said tamper detecting mechanism includes:
   placing the RFID apparatus in proximity to an RFID reader;
   if the RFID apparatus is functional, reading a data field from the RFID apparatus;
   examining the data field to determine if the data field has been updated indicating the credentials have been verified and the apparatus has been tightened to the wearer; and
   if the data field has been updated, allowing use of the RFID apparatus.

6. The method of claim 3, wherein the RFID apparatus includes a band, and said tamper detecting mechanism including an electrically conductive loop disposed in the band, wherein severance of the electrically conductive loop disables the functionality of the RFID apparatus.

7. The method of claim 1, wherein the tightening mechanism includes a series of projections, positioned to allow the apparatus to be tightened and not loosened.

8. The method of claim 1, wherein the RFID apparatus includes:
   an RFID circuit disposed in the RFID apparatus; and
   an antenna also disposed in the RFID apparatus, the RFID circuit, the antenna, and the electrically conductive loop coupled in a series, wherein severance of the electrically conductive loop disables the functionality of the RFID circuit.

9. The method of claim 1, wherein the credentials associated with use of the apparatus include at least one of the age of the wearer, authorization for access to a restricted area, and a reentry request of the wearer.

10. The method of claim 1, wherein the RFID apparatus includes an RFID chip; the data field being stored on an electrically erasable programmable read-only memory within one of the RFID chip or in an external database.

11. A system of using an RFID apparatus, comprising:
   an authorized person for verifying credentials associated with authorization for a particular use of an RFID apparatus;
   the RFID apparatus including a fastening device configured to allow adjustment in only one direction such that the RFID apparatus may be attached to a wearer and then further tightened to the wearer only after the wearer's credentials have been verified, the RFID apparatus not loosening without permanently disabling the RFID apparatus; and
   a data field associated with the RFID apparatus and configured to be updated to indicate that the wearer's credentials have been verified.

12. The system of claim 11, further comprising an activation mechanism for activating the RFID apparatus once the credentials have been verified and the RFID apparatus has been further tightened to the wearer.

13. The system of claim 12, wherein the activation mechanism comprises:
   an RFID reader for determining if the RFID apparatus is functional and for reading identification information associated with the activated RFID apparatus; and
   a database storing the data field associated with the further tightening of the RFID apparatus.

14. The system of claim 11, wherein the RFID apparatus includes an electrically conductive loop disposed in the RFID apparatus, wherein severance of the electrically conductive loop disables the RFID apparatus.

15. The system of claim 11, wherein the RFID apparatus includes:
   an RFID circuit disposed in the RFID apparatus; and
   an antenna also disposed in the RFID apparatus, the RFID circuit, the antenna, and the electrically conductive loop coupled in a series, wherein severance of the electrically conductive loop disables the RFID circuit.

16. The system of claim 13, wherein an RFID reader activates the RFID apparatus by updating a data field stored on at least one of an electrically erasable programmable read-only memory within an RFID chip, or in an external database.

17. The system of claim 11, wherein the credentials associated with use of the apparatus include at least one of the age of the wearer, authorization for access to a restricted area, and a reentry request.

18. A method for authorizing use of a disabling RIND apparatus, comprising the steps of:

adjustably attaching the RFID apparatus to the wearer to prevent removal or loosening of the RFID apparatus without permanently disabling the RFID apparatus;

verifying credentials associated with a specific use of the REID apparatus; and only if the credentials are verified, updating a data field associated with the REID apparatus and verifying the appropriate attachment of the REID apparatus.

19. The method of claim 18, wherein verifying the appropriate attachment comprises the step of tightening the REID apparatus to the wearer.

* * * * *

UNITED STATES PATENT AND TRADEMARK OFFICE
CERTIFICATE OF CORRECTION

PATENT NO. : 7,388,493 B2
APPLICATION NO. : 11/245482
DATED : June 17, 2008
INVENTOR(S) : John W. Lerch and Joshua M. Girvin It is certified that error appears in the above-identified patent and that said Letters Patent is hereby corrected as shown below:

Column 7
Line 52, delete "RFLD" and insert --RFID--.

Column 9
Line 12, delete "RIND" and insert --RFID--.

Column 10
Line 5, delete "REID" and insert --RFID--;
Line 7, delete "REID" and insert --RFID--;
Line 8, delete "REID" and insert --RFID--;
Line 10, delete "REID" and insert --RFID--.

Signed and Sealed this

Thirtieth Day of September, 2008

JON W. DUDAS
*Director of the United States Patent and Trademark Office*